June 23, 1942.  O. OLTMANNS  2,287,265
SAW FILING MACHINE
Filed April 10, 1941  2 Sheets-Sheet 1
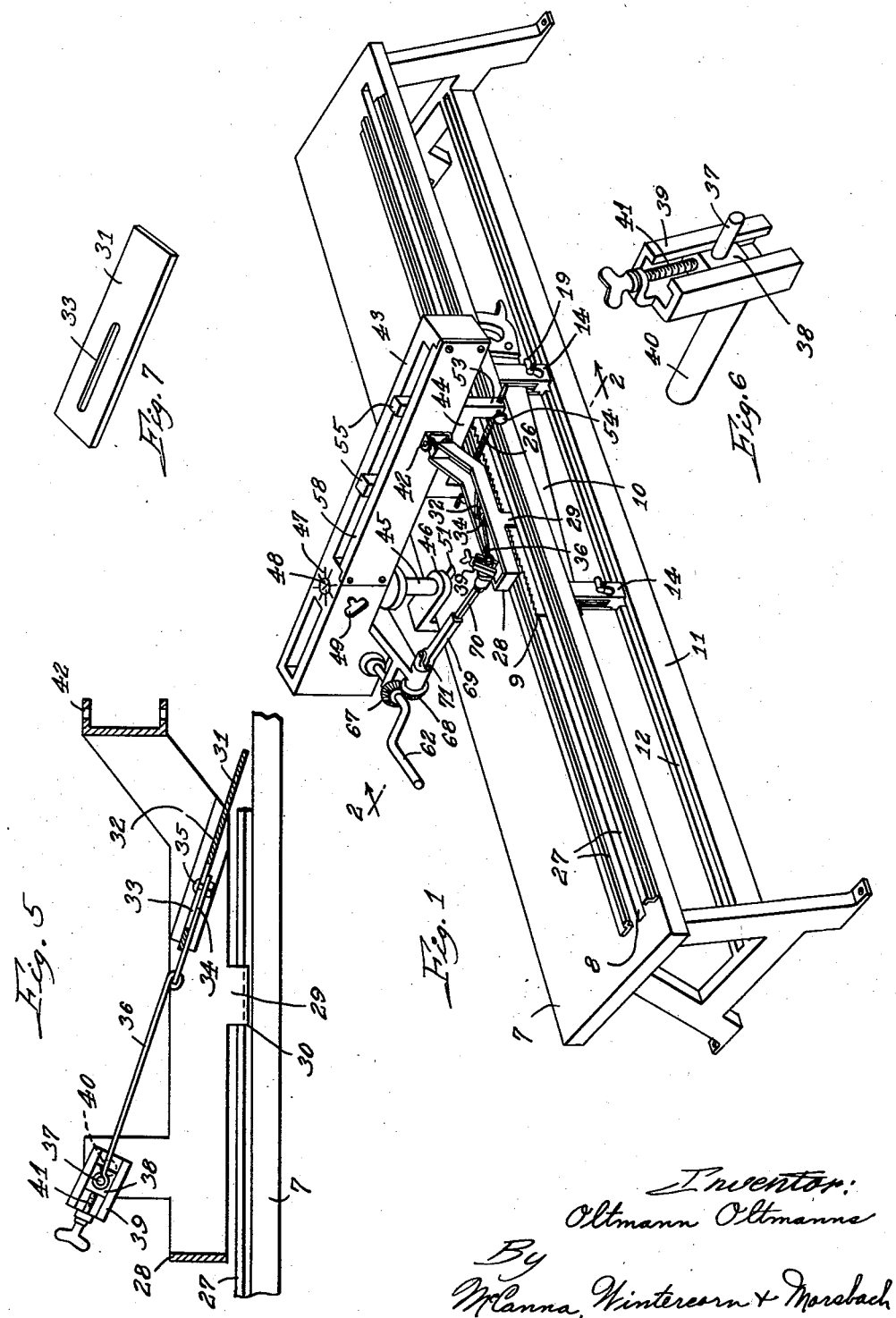

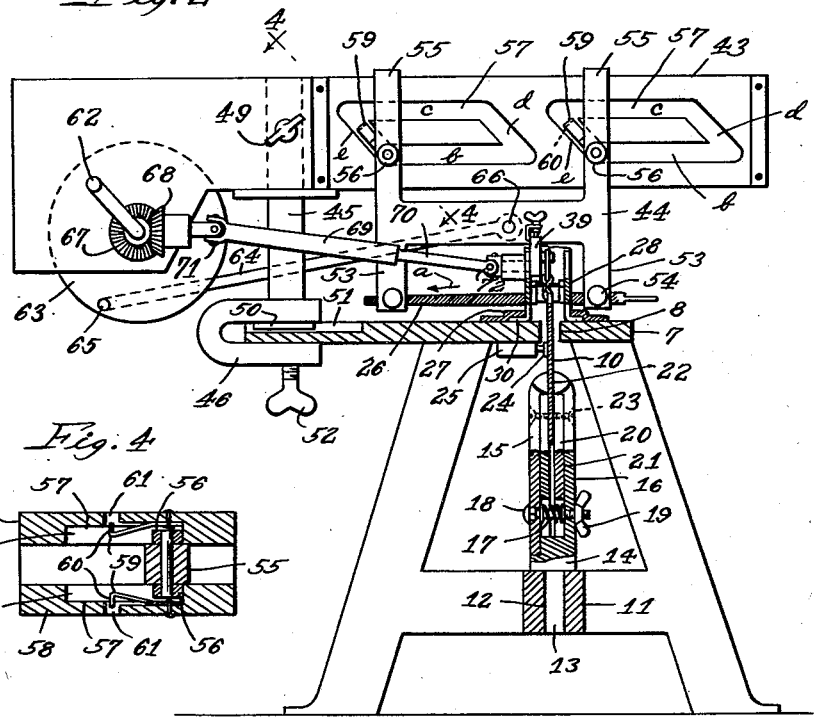
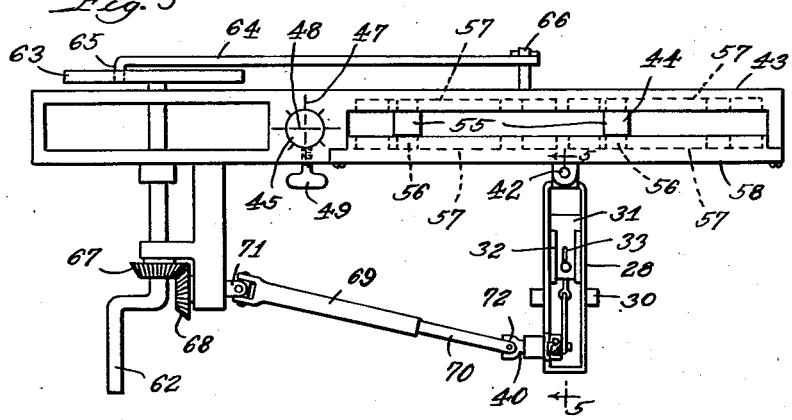

Patented June 23, 1942

2,287,265

UNITED STATES PATENT OFFICE 2,287,265

SAW FILING MACHINE

Oltmann Oltmanns, Baileyville, Ill.

Application April 10, 1941, Serial No. 387,929

8 Claims. (Cl. 76—35)

This invention relates to an improved saw filing machine, the present application being a continuation in part of my copending application Serial No. 259,010, filed February 28, 1939.

One of the principal objects of my invention is to provide a saw filing machine of much simpler and more economical construction than has been available heretofore, and one in which the travel of the file in a lower plane on the working stroke and in a higher plane on the return stroke is accomplished smoothly and quietly and in such a way that the file is always guided accurately with respect to the saw in the same manner in all of the working strokes, the file being furthermore kept entirely clear of the saw throughout all return strokes so that there is no danger of accidental damage to the saw-teeth in the indexing of the saw between the working strokes. Other objects of the invention will also appear in the course of the following specification, in which reference is made to the accompanying drawings, wherein—

Figure 1 is a perspective view of my improved saw filing machine;

Fig. 2 is a vertical cross-section on the line 2—2 of Fig. 1;

Fig. 3 is a top plan view of the upper portion of Fig. 2;

Fig. 4 is a sectional detail on the line 4—4 of Fig. 2;

Fig. 5 is an enlarged sectional detail on the line 5—5 of Fig. 3;

Fig. 6 is a perspective view of a portion of the mechanism shown in Fig. 5, and

Fig. 7 is a perspective view of the saw-tooth engaging dog.

The same reference numerals are applied to corresponding parts throughout the views.

The machine comprises a table 7 that is slotted longitudinally, as indicated at 8, for projection of the toothed edge 9 of a hand saw-blade 10 therethrough. A longitudinal bottom member 11 below the table top is grooved longitudinally, as indicated at 12, to guide the flat sided shanks 13 of the saw clamps 14. The jaws 15 and 16 of each clamp are urged apart by a coiled compression spring 17 surrounding the bolt 18 entered through the jaws, and a wing nut 19 threaded on the projecting end of the bolt serves when tightened to draw the jaws together into tight engagement with the saw-blade entered therebetween. Filler plates 20 removably secured in place in recesses 21 in the inner faces of the jaws below the upper end portions 22 by screws 23 are adapted to be removed to provide recesses below the projecting gripping ends 22 of the jaws, so that miter saw-blades that have the smooth back edges thereof enclosed in the conventional manner by reinforcing strips may be just as conveniently clamped as the blades of ordinary hand saws. A spring pressed plunger 24 bears against the side of the saw-blade to hold the same frictionally in each indexed position, and this plunger may, if desired, have a covering of leather or rubber or any suitable composition material to provide the desired coefficient of friction. A hollow block 25 suitably secured to the under side of the table top alongside the slot 8 provides a mounting and guide for the plunger. Incidentally since the working strokes of the file 26 are from right to left as viewed in Fig. 2 and indicated by the arrow a, the spring pressed plunger 24 bearing as it does against the left side of the blade immediately below the point of engagement of the file with the saw-blade serves to support the saw-blade against deflection by reason of the side thrust imposed upon the saw-blade by the file, and in that way there is less likelihood of chattering and the grade of work done is accordingly improved. If desired, I may provide one or more additional spring pressed friction plungers above or below the table top 7, although usually a single plunger in sufficiently closely spaced relation to the toothed edge 9 of the saw-blade and also close enough to the point of engagement of the file with the saw-blade gives the desired results.

The saw-blade 10 is arranged to be indexed one or more teeth at a time between working strokes of the file. For that purpose I provide a pair of guides 27 on top of the table alongside the slot 8, in which there is slidable a frame 28 having two legs 29 straddling the toothed edge portion of the saw-blade and having feet 30 slidable in the guides 27. A plate 31 slidable in inclined guideways 32 provided in the frame 28 constitutes the saw-blade indexing dog. This plate is flexible enough and projects far enough from the guides 32 for engagement with the saw-teeth so that it will flex readily as required in its reciprocation while constantly in engagement with the toothed edge of the blade, the plate being of light enough gauge so as not to require too much force to flex the same and so that there is no noticeable scratching of the saw-teeth or dulling of the points thereof as the plate rides over the teeth in the return strokes. The teeth of the saw-blade, in other words, provide the rack means movable with the saw supporting clamps 14 for indexing the saw-blade. The plate is slotted longitudinally, as at 33, for the adjustable connection of a plate 34 thereon by means of a bolt 35. A pitman rod 36 is pivotally connected to the free end of the plate 34 at one end and at its other end is pivoted on a crank pin 37 carried on a block 38 slidably adjustable radially in a crank member 39 rotatably mounted by means of its shaft 40 in the frame 28. A screw 41 held against endwise movement on the crank 39 threads in the block 38 and serves to increase or decrease the stroke of the plate 31 by a change in the operating radius of the crank pin 37. In that way the saw-blade 10 can be indexed one or more teeth for each revolution of the crank and inasmuch as the file 26, as will soon appear, completes one cycle of a working stroke and return stroke for each turn of the crank 39, it follows that the file 26 may be made to operate on consecutive or on alternate teeth.

The frame 28 is pivotally connected at 42 with the frame 43 on which the file 26 is reciprocably mounted by means of its carrier 44. The frame 43 is angularly adjustably mounted with respect to the table 7 on a standard 45 which, in turn, is adjustably clamped to the table top, as indicated at 46. Gauge lines 47 and 48 are provided on top of the frame 43 and on the upper end of the standard 45 to enable accurate setting of the frame 43 with respect to the standard so as to insure having the file 26 operate at the correct angle with respect to the saw blade. A set screw 49 threaded in the frame 43 serves by engagement with the standard 45 to clamp the frame in adjusted position. A key projection 50 on the clamp 46 fits closely in a keyway 51 provided in the table 7 at right angles to the slot 8 so as to prevent turning of the standard 45 with respect to the table top, while permitting such adjustment of the standard toward and away from the slot 8 as will be required for different angular adjustments of the frame 43, and in that way accurate positioning of the frame 43 at the desired angles is made possible. The set screw 52 on the clamp 46 is tightened only after the desired angular adjustment of the frame 43 has been obtained and it is determined that the frame 28 is disposed substantially parallel with the slot 8 so that the indexing dog plate 31 will cooperate properly with the saw-teeth.

The file carrier 44 has two downwardly reaching arms 53 for supporting the file 26, the file being suitably entered through holes in these arms and clamped by set screws 54. Two upwardly reaching arms 55 on the carrier 44 have rollers 56 projecting from the opposite sides thereof. The frame 43 has two parallelogram-shaped grooves 57 provided therein to receive the rollers on one side of the arms, and there is a plate 58 fastened onto the frame 43 which has similar grooves 57 provided therein to receive the rollers on the other side of the arms 55. The plate 58 is removed in Fig. 2 in order to disclose the grooves 57 in the frame 43. The horizontal lower portions b of the grooves guide the rollers 56 in the working strokes of the file 26 and the horizontal upper portions c guide the rollers 56 in the return strokes. The inclined front end portions d of the grooves guide the rollers 56 in their downward movement at the end of the return strokes preparatory to commencement of the working strokes. The inclined rear ends e of the grooves guide the rollers 56 in their upward movement at the end of the working strokes as the file is elevated for the commencement of the return strokes. Leaf springs 59 are provided in the inclined rear ends e of the grooves for sliding engagement with the side faces of the rollers 56 in their upward movement in the inclined rear ends e of the grooves, the carrier 44 being given sufficient movement in the direction of the arrow a for the rollers 56 to ride past the springs 59. Then, in the return or forward movement of the carrier 44, the rollers 56 are compelled to travel along the horizontal upper portions c of the grooves, inasmuch as the outwardly bent ends 60 of the leaf springs 59 block off the upper ends of the inclined portions e of the grooves and thus prevent return of the rollers downwardly in the portions e. Holes 61 are provided in the frame 43 and plate 58 for free movement of the end portions 60 of the leaf springs 59 in the outward flexing of these springs by the rollers. The rollers 56 working in the parallelogram-shaped grooves 57 cause the carrier 44 to travel in a parallelogram-shaped path and the file 26 is therefore brought into contact with the saw-teeth in exactly the same manner each and every time and is given the same working stroke in each operation and is withdrawn again from the saw-teeth and kept clear of the teeth throughout the return movement, during which the indexing means previously described, operated in timed relation with the file carrier 44, serves to index the saw-blade so as to present the next saw-tooth, or the one after that, depending on the saw being filed and the adjustment made on the crank arm 39 for the crank pin 37.

While I have shown a hand crank 62 for manual operation of the machine, it will, of course, be understood that power operated means may be provided. The crank 62 is connected with a wheel 63 onto which a pitman rod 64 is attached at one end, as indicated at 65, the other end being pivotally connected, as at 66, to the file carrier 44. Bevel gears 67 and 68 provide a power take-off for driving the crank-shaft 40 of the indexing mechanism. An internally splined sleeve 69 has a telescoping driving connection with a shaft 70, and the sleeve has a universal joint connection at 71 with the gear 68, while the shaft 70 has a universal joint connection at 72 with the shaft 40. In that way the length of the driving connection as well as the angle of its extension from the gear 68 to the crank-shaft 40 is adjustable to suit the different adjustments of the frame 43.

It is believed the foregoing description conveys a good understanding of the objects and advantages of my invention. The appended claims have been drawn to cover all legitimate modifications and adaptations.

I claim:

1. In a saw filing machine, a saw support adapted to permit movement of a saw carried thereby, a frame extending transversely relative to the support, another frame movable relative to the first frame adapted to hold a file in working relation to said support, one of said frames having a pair of endless parallelogram-shaped grooves provided therein, followers on the other of said frames working in said grooves to guide the movable frame for movement in a parallelogram path always parallel to the support, means to prevent retrograde movement of the followers relative to the grooves at one end of the reciprocatory movement of the movable frame relative to the stationary frame, and means for reciprocating the movable frame.

2. In a saw filing machine, a file support adapted to permit reciprocatory movement of a file carried thereby, a saw supporting table having a longitudinal slot provided therein and longitudinal guideways provided thereon alongside the slot, the slot and guideways extending transversely relative to the file support, said table also having a longitudinal groove provided therein in vertical alignment with and beneath the slot, saw supporting clamps slidable in said groove to support a saw-blade with the toothed edge portion projecting upwardly through the slot, a frame connected to the file support slidable in said guides in straddling relation to the toothed edge portion of the saw-blade, a flexible plate slidably guided in said frame in inclined relation to the table and adapted to engage the saw-teeth one at a time to move the saw-blade in an indexing movement, said plate flexing in the indexing movement due to the inclination of its guides and being also adapted to flex in sliding from one tooth to the next, and means for reciprocating said plate relative to the frame.

3. A saw filing machine as set forth in claim 2, including detent means on said table frictionally engaging the saw-blade to hold it against accidental movement from indexed position.

4. A saw filing machine as set forth in claim 2, including a spring pressed detent plunger mounted on the table and frictionally engaging the adjacent side face of the saw-blade on the far side with respect to the direction of movement of the file in the working strokes, said detent plunger frictionally resisting movement of the saw-blade to prevent accidental movement thereof from indexed position, and said detent plunger also supporting said blade against lateral deflection incident to the action of the file on the toothed edge thereof, said detent plunger being disposed in sufficiently closely spaced relation to the toothed edge of the saw-blade and in sufficiently closely spaced relation to the point of engagement of the file with said blade to assume the side thrust transmitted to the blade by the file.

5. A saw filing machine as set forth in claim 2, including a supporting standard for the file support relative to which the file support is angularly adjustable, means for securing the file support in angularly adjusted relation to the standard, the frame slidable in the guides on the saw supporting table being pivotally connected with the file support to permit angular adjustment of the latter relative to the former, and said standard having a key projection thereon slidable in a keyway provided in the table in right angle relation to the slot, whereby to permit adjustment of the standard toward and away from the slot while preventing rotation of said standard, and means for clamping the standard in adjusted relation to the table.

6. A saw filing machine as set forth in claim 1, wherein the means to prevent retrograde movement of the followers relative to the grooves comprises outwardly projecting leaf springs at one end of the parallelograms over which the followers are arranged to slide in their upward movement in retracting the file relative to the work, whereby to prevent downward movement of said followers at that end of the parallelogram.

7. In a saw filing machine, a saw support adapted to permit movement of a saw carried thereby, a frame extending transversely relative to the support, a generally H-shaped frame movable relative to the first frame adapted to hold a file between the lower ends of the legs of the H in working relation to said support while guided on the first frame by the upper end portions of the legs of said H, said first frame having a pair of endless parallelogram-shaped grooves provided therein, followers on the upper end portions of the legs of the H-frame working in said grooves to guide the H-frame for movement in a parallelogram path in which the file carried thereby is always parallel to the support, said H-frame being movable downwardly relative to one end of the parallelograms by gravity to bring the file carried thereby to the working plane and being movable upwardly relative to the other end of the parallelograms against gravity to retract the file from the working plane, means in the latter end of the parallelograms to prevent downward movement of the followers relative to the grooves, and means for reciprocating said H-frame from end to end of the parallelograms.

8. A saw filing machine as set forth in claim 7, wherein the last mentioned means is pivotally connected with the cross-portion of the H approximately midway between the legs of the H and the followers thereon.

OLTMANN OLTMANNS.